US012705867B2

(12) United States Patent
Tsukahara et al.

(10) Patent No.: US 12,705,867 B2
(45) Date of Patent: Aug. 11, 2026

(54) IMAGE PROCESSING APPARATUS, CONTROL APPARATUS, IMAGE PROCESSING METHOD, AND STORAGE MEDIUM

(71) Applicant: CANON KABUSHIKI KAISHA, Tokyo (JP)

(72) Inventors: Azusa Tsukahara, Tokyo (JP); Gaku Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 379 days.

(21) Appl. No.: 18/500,306

(22) Filed: Nov. 2, 2023

(65) Prior Publication Data

US 2024/0177463 A1 May 30, 2024

(30) Foreign Application Priority Data

Nov. 29, 2022 (JP) ................................ 2022-190385

(51) Int. Cl.
*G06V 10/776* (2022.01)

(52) U.S. Cl.
CPC .................................. *G06V 10/776* (2022.01)

(58) Field of Classification Search
CPC .......... G06V 10/776; G02B 7/04; G02B 9/00; G02B 13/12; G02B 15/00; G02B 15/15; G02B 17/0694; G02B 21/025; H04N 1/0432; H04N 1/32208
See application file for complete search history.

(56) References Cited

U.S. PATENT DOCUMENTS

| | | | | |
|---|---|---|---|---|
| 6,867,933 B2 * | 3/2005 | Matsusaka | G02B 13/006 | 348/335 |
| 7,268,917 B2 * | 9/2007 | Watanabe | H04N 1/401 | 348/241 |
| 7,929,043 B2 * | 4/2011 | Tsubaki | H04N 23/68 | 348/348 |
| 9,864,899 B2 * | 1/2018 | Matsuhashi | G06V 10/96 | |
| 11,842,466 B2 | 12/2023 | Sugai | | |
| 11,889,186 B2 * | 1/2024 | Yoshimura | G06T 5/80 | |
| 2013/0120524 A1 * | 5/2013 | Zheng | H04N 5/265 | 348/36 |
| 2016/0042515 A1 * | 2/2016 | Sorgi | G06T 7/80 | 382/154 |
| 2019/0215440 A1 * | 7/2019 | Rivard | G06V 10/22 | |
| 2019/0266423 A1 * | 8/2019 | Akiba | G06T 7/74 | |
| 2022/0084169 A1 | 3/2022 | Sugai | | |
| 2022/0318960 A1 | 10/2022 | Tsuchiya | | |

FOREIGN PATENT DOCUMENTS

| | | | |
|---|---|---|---|
| EP | 2421250 A2 * | 2/2012 | H04N 25/61 |
| JP | 2022-049261 A | 3/2022 | |
| JP | 2022-157399 A | 10/2022 | |
| WO | WO-03092306 A1 * | 11/2003 | H04N 17/004 |

* cited by examiner

*Primary Examiner* — Manav Seth
(74) *Attorney, Agent, or Firm* — Venable LLP

(57) ABSTRACT

An image processing apparatus includes a memory storing instructions, and a processor configured to execute the instructions to acquire information about an optical system included in an image pickup apparatus configured to capture an image, acquire a change amount in the information about the optical system in a peripheral area of a target pixel in the image based on the information about the optical system, and acquire, based on the change amount, information about recognition accuracy in the peripheral area by a recognition apparatus configured to perform image recognition.

15 Claims, 6 Drawing Sheets

| RECOGNITION ACCURACY | | CHANGE AMOUNT Δx IN x DIRECTION | | |
|---|---|---|---|---|
| | | SMALL | MEDIUM | LARGE |
| CHANGE AMOUNT Δy IN y DIRECTION | SMALL | HIGH | MEDIUM | LOW |
| | MEDIUM | MEDIUM | MEDIUM | LOW |
| | LARGE | LOW | LOW | LOW |

IMAGE PROCESSING APPARATUS, CONTROL APPARATUS, IMAGE PROCESSING METHOD, AND STORAGE MEDIUM

BACKGROUND

Technical Field

One of the aspects of the embodiments relates to an image processing apparatus, a control apparatus, an image processing method, and a storage medium.

Description of Related Art

One conventional configuration utilizes images in which the types of objects are known and recognizes the type of an object in a captured image using a classifier that has learned a relationship between the object type and features on the image. The learning uses images with little distortion or images with corrected distortion, but in recognizing the type of object in an image acquired using an optical system with large distortion, the recognition accuracy decreases because the object has a shape different from the learned shape. Japanese Patent Laid-Open No. 2022-157399 discloses a recognition configuration using distortion corrected images. Japanese Patent Laid-Open No. 2022-49261 discloses a learning configuration using an image having distortion.

However, the configuration disclosed in Japanese Patent Laid-Open No. 2022-157399 performs distortion correction for each captured image, takes a long processing time, and requires the resource of the calculation unit. The configuration disclosed in Japanese Patent Laid-Open No. 2022-49261 performs learning for each optical system, and thus the network of classifiers is likely to become large.

SUMMARY

An image processing apparatus according to one aspect of the embodiment includes a memory storing instructions, and a processor configured to execute the instructions to acquire information about an optical system included in an image pickup apparatus configured to capture an image, acquire a change amount in the information about the optical system in a peripheral area of a target pixel in the image based on the information about the optical system, and acquire, based on the change amount, information about recognition accuracy in the peripheral area by a recognition apparatus configured to perform image recognition. A control apparatus including the above image processing apparatus also constitutes another aspect of the embodiment. An image processing method corresponding to the above image processing apparatus also constitutes another aspect of the embodiment. A storage medium storing a program that causes a computer to execute the above image processing method also constitutes another aspect of the embodiment.

Further features of the disclosure will become apparent from the following description of embodiments with reference to the attached drawings.

DESCRIPTION OF THE EMBODIMENTS

Figure 1:
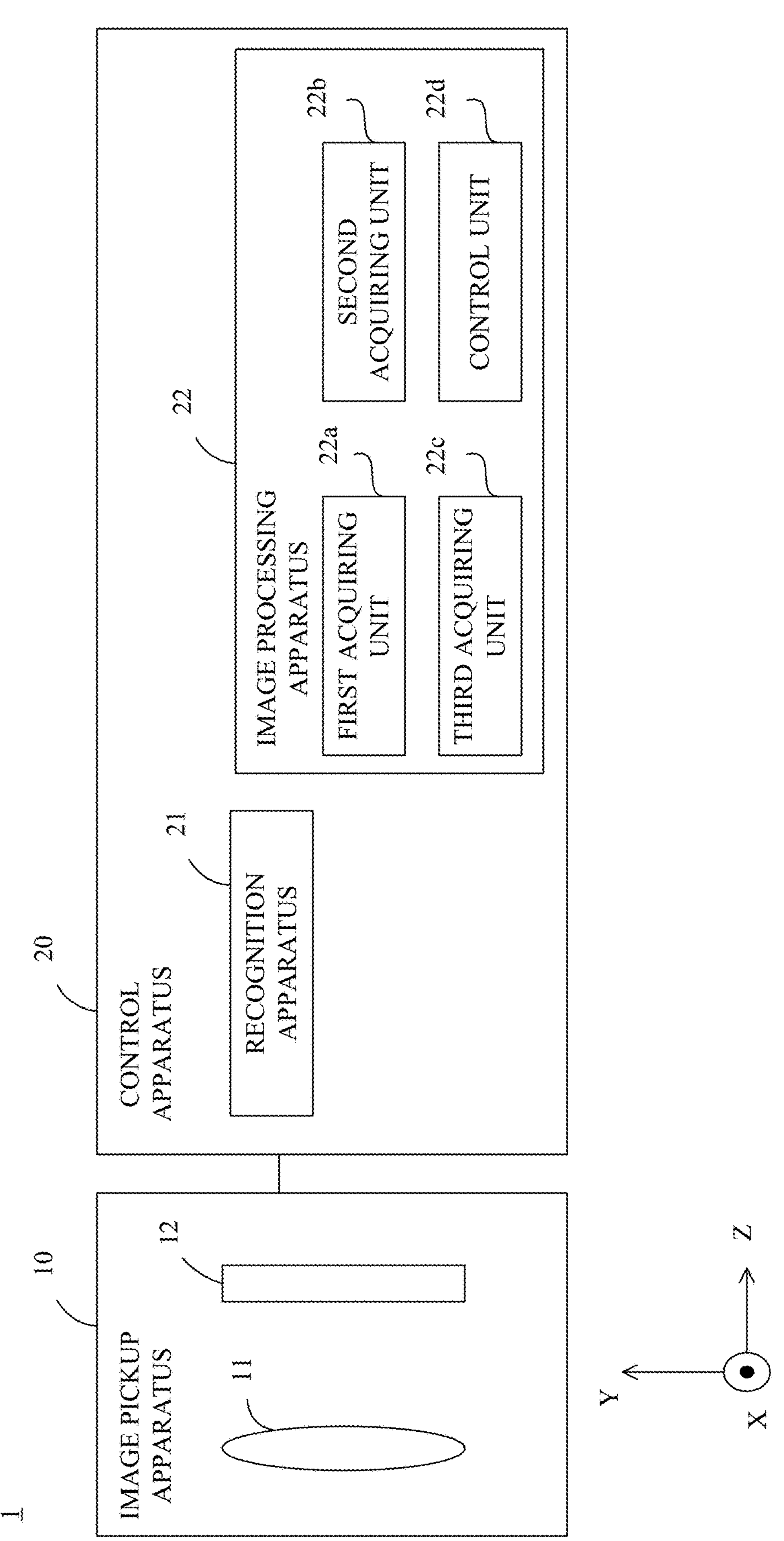
FIG. 1 illustrates a configuration of an image recognizing system according to this embodiment.

In the following, the term “unit” may refer to a software context, a hardware context, or a combination of software and hardware contexts. In the software context, the term “unit” refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term “unit” refers to a hardware element, a circuit, an assembly, a physical structure, a system, a module, or a subsystem. Depending on the specific embodiment, the term “unit” may include mechanical, optical, or electrical components, or any combination of them. The term “unit” may include active (e.g., transistors) or passive (e.g., capacitor) components. The term “unit” may include semiconductor devices having a substrate and other layers of materials having various concentrations of conductivity. It may include a CPU or a programmable processor that can execute a program stored in a memory to perform specified functions. The term “unit” may include logic elements (e.g., AND, OR) implemented by transistor circuits or any other switching circuits. In the combination of software and hardware contexts, the term “unit” or “circuit” refers to any combination of the software and hardware contexts as described above. In addition, the term “element,” “assembly,” “component,” or “device” may also refer to “circuit” with or without integration with packaging materials.

Referring now to the accompanying drawings, a detailed description will be given of embodiments according to the disclosure. Corresponding elements in respective figures will be designated by the same reference numerals, and a duplicate description thereof will be omitted.

FIG. 1 illustrates the configuration of an image recognizing system 1 according to an embodiment. The image recognizing system 1 includes an image pickup apparatus 10 and a control apparatus 20. The image pickup apparatus 10 and the control apparatus 20 are communicably connected to each other. In this embodiment, the image pickup apparatus 10 and the control apparatus 20 are separate from each other, but the image pickup apparatus 10 may have the functions of the control apparatus 20.

The image pickup apparatus 10 includes an imaging optical system 11, which is an optical element including a lens, and an image sensor 12 that captures an image formed by the imaging optical system 11, and acquires an image by imaging around a set location. The imaging optical system 11 may use a lens with a wide angle of view. The image pickup apparatus 10 transmits an acquired image to the control apparatus 20.

The control apparatus 20 includes a computer (such as an Electronic Control Unit (ECU)) including at least one processor, memory, etc., and performs calculation processing such as image processing using the image acquired from the image pickup apparatus 10. The control apparatus 20 may have the function of controlling the image pickup apparatus 10 to perform imaging.

The control apparatus 20 includes a recognition apparatus 21 and an image processing apparatus 22. The recognition apparatus 21 performs image recognition processing for the image captured by the image pickup apparatus 10, detects an object included in the image, and recognizes the type of the object, etc. The recognition apparatus 21 includes, for example, a classifier that has learned a relationship between object types and features (characteristics) on images. In this way, the recognition apparatus 21 performs image recognition for a captured image and can recognize the type of object illustrated in the image. The recognition apparatus 21 can perform image recognition on a real-time basis by repeatedly performing recognition processing using moving images or continuous images.

The image processing apparatus 22 includes a first acquiring unit 22*a*, a second acquiring unit 22*b*, a third acquiring unit 22*c*, and a control unit 22*d*.

The first acquiring unit 22*a* acquires information about the imaging optical system 11. The information about the imaging optical system 11 includes information indicating the optical characteristic or feature of the imaging optical system 11. A more specific example of information about the imaging optical system 11 includes information about image magnification, which affects the magnitude of distortion.

Figure 2A:
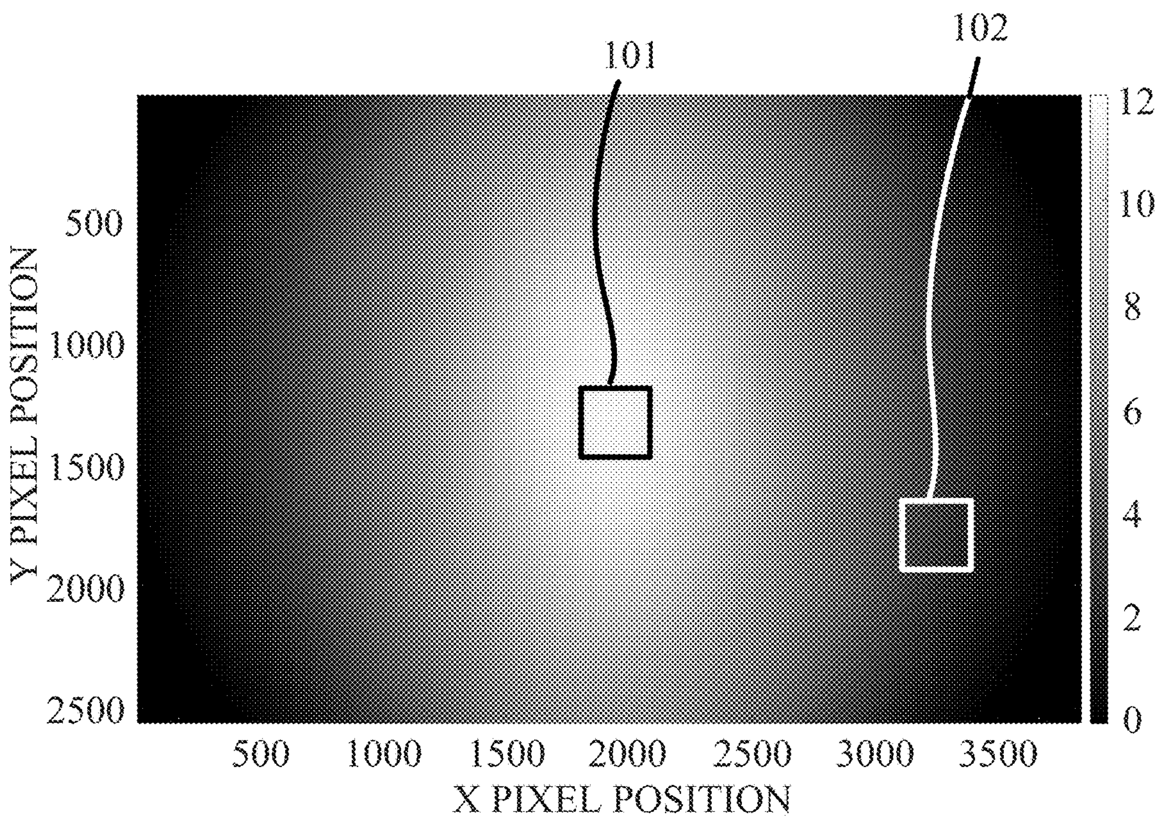
FIGS. 2A and 2B illustrate an example of parameters representing the image magnification of an image obtained using an imaging optical system.
Figure 2B:
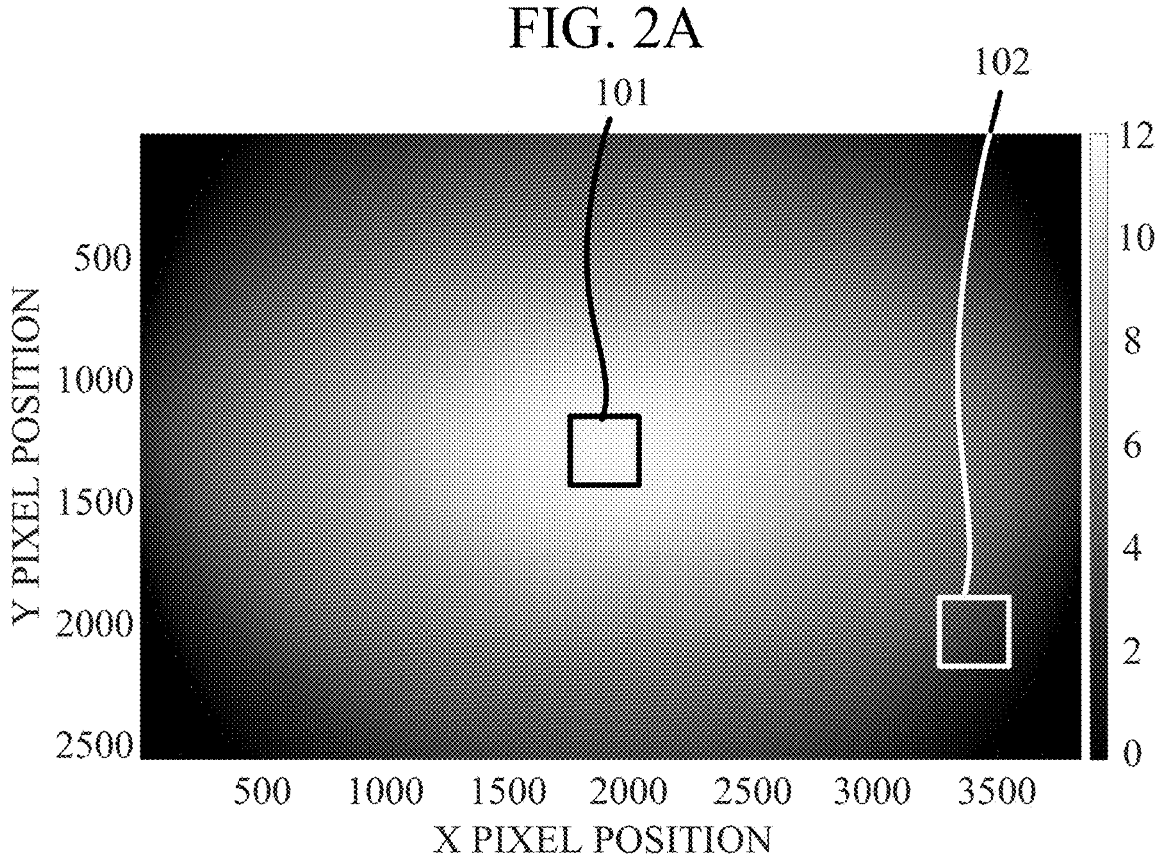

FIGS. 2A and 2B illustrate an example of parameters representing the image magnification of an image acquired using the imaging optical system 11. The larger the parameter value is, the larger the image magnification is. FIGS. 2A and 2B illustrate parameters representing the image magnification in the X direction and Y direction, respectively. As illustrated in FIGS. 2A and 2B, the imaging optical system 11 is configured such that the image magnification increases as the pixel is closer to the center.

Figure 3:
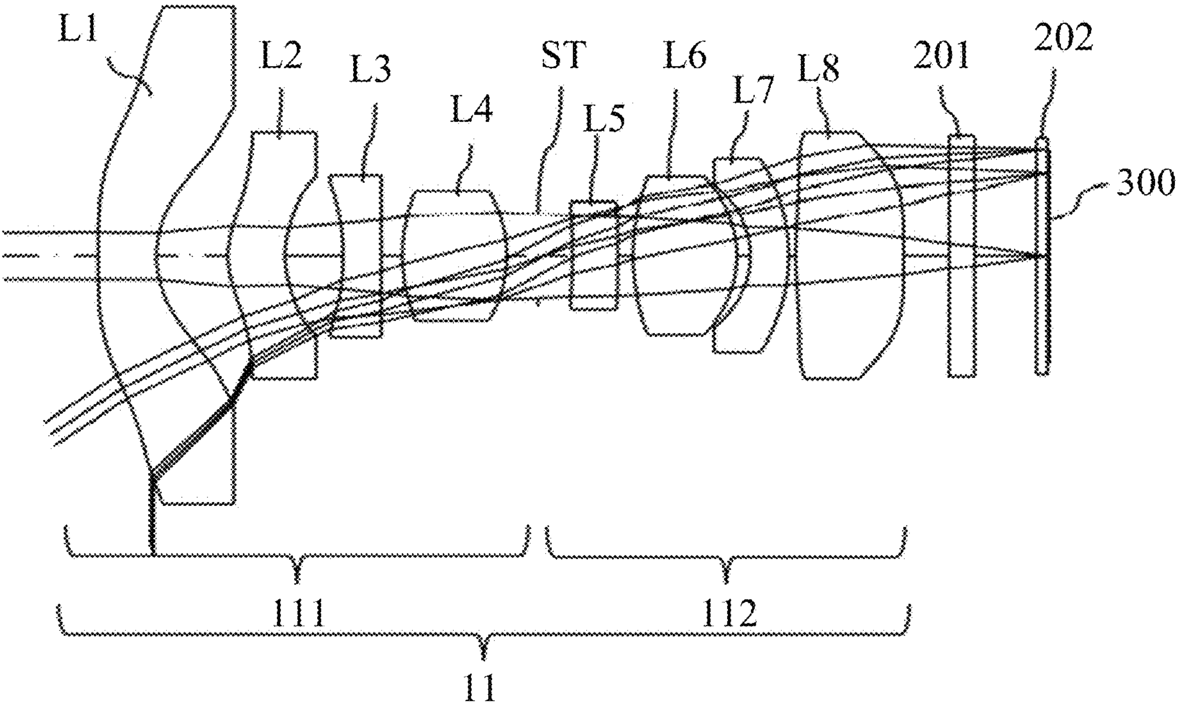
FIG. 3 illustrates an example of an imaging optical system.

FIG. 3 illustrates an example of the imaging optical system 11. In FIG. 3, a left side is an enlargement conjugate side (object side), and a right side is a reduction conjugate side (image side). The imaging optical system 11 is an imaging optical system that condenses a light beam from an unillustrated object located on the enlargement conjugate side to form an object image on an image plane 300 on the reduction conjugate side.

The imaging optical system 11 includes, in order from the enlargement conjugate side to the reduction conjugate side, a front group 111 including a plurality of lenses, an aperture stop ST, and a rear group 112 including a plurality of lenses. An IR cut filter 201 and a cover glass 202 are disposed between the imaging optical system 11 and the image plane 300. A low-pass filter or the like may be additionally disposed as necessary, or the IR cut filter 201 or the like may be omitted.

The front group 111 includes lenses L1, L2, L3, and L4 in order from the enlargement conjugate side to the reduction conjugate side. The rear group 112 includes L5, L6, L7, and L8 in order from the enlarged conjugate side to the reduced conjugate side. The lens L1 disposed closest to the enlargement conjugate plane in the front group 111 is an aspherical lens (first aspherical lens) having aspherical surfaces on both the enlargement conjugate side and the reduction conjugate side, and a negative paraxial refractive power (paraxial power). The second lens L2 as a second lens from the enlargement conjugate side in the front group 111 is an aspherical lens (second aspherical lens) having aspherical surfaces on both sides, and positive paraxial refractive power. The lenses L3 and L4 as third and fourth lenses from the enlargement conjugate side in the front group 111 are both spherical lenses, and have negative and positive refractive powers, respectively. The lenses L5, L6, and L7 as a lens closest to the enlargement conjugate plane, and second and third lenses from the enlargement conjugate side in the rear group 112, respectively, are all spherical lenses, and have negative, positive, and negative refractive powers. The lens (final lens) L8 closest to the reduction conjugate plane in the rear group 112 is an aspherical lens (third aspherical lens) having aspherical surfaces on both sides, and positive paraxial refractive power.

The imaging optical system 11 is an optical system in which an angle between the optical axis and the most off-axis principal ray, that is, the maximum half angle of view θmax is π/2 (=90°), and has a maximum half angle of view equivalent to that of a fisheye lens. However, the value of the maximum half angle of view θmax is merely an example, and this embodiment is not limited to this example. The imaging optical system 11 is an optical system that has a larger imaging magnification in an angle-of-view area near the center (referred to as a center angle-of-view area hereinafter) than that of a fisheye lens.

Figures 4A, 4B:
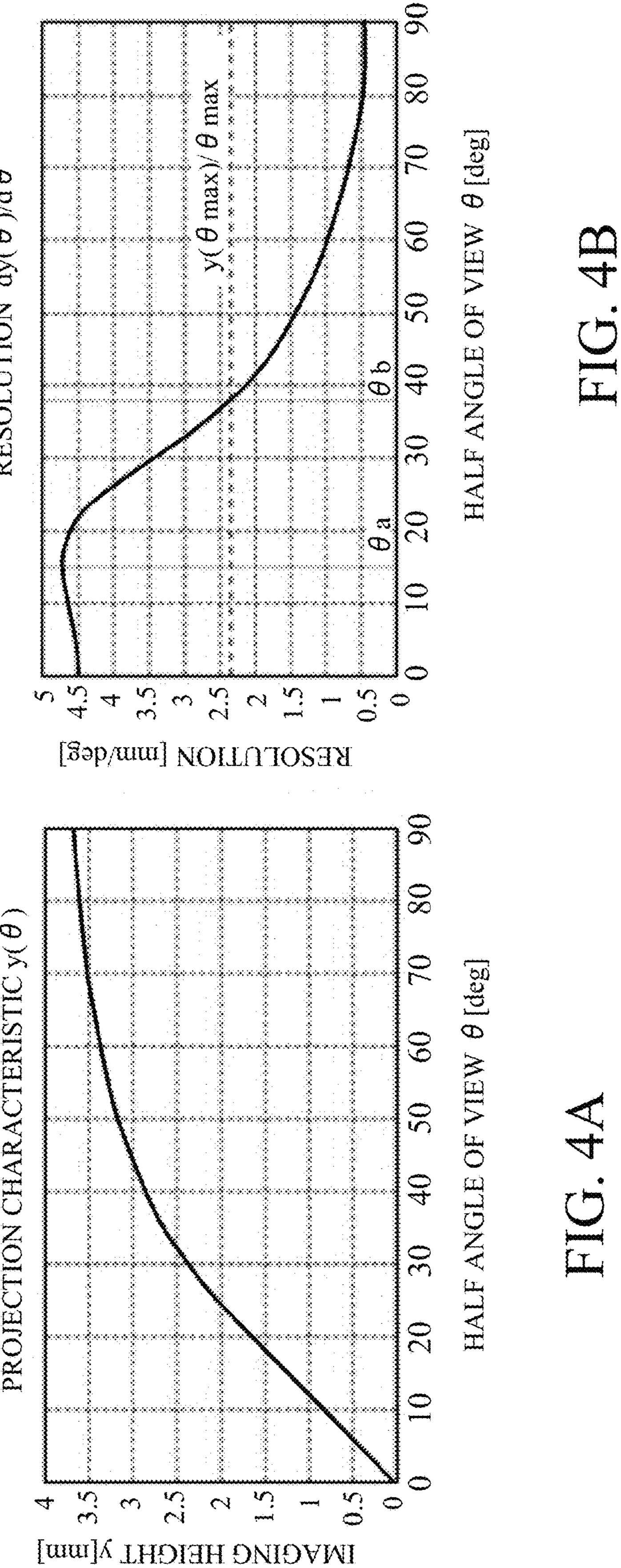
FIGS. 4A and 4B illustrate other examples of optical characteristics of the imaging optical system.

FIGS. 4A and 4B illustrate other examples of optical characteristics of the imaging optical system 11. FIGS. 4A and 4B illustrate the projection characteristic and resolution characteristic of the imaging optical system 11, respectively. FIGS. 4A and 4B use degrees (deg) as the unit of an angle of view. The projection characteristic $y(\theta)$ illustrated in FIG. 4A represents a relationship between the half angle of view (angle between the optical axis and the incident ray) θ and an imaging height (image height) y on the image plane 300. The resolution characteristic illustrated in FIG. 4B represents a change amount in the imaging height y against a minute change in the angle of view at the half angle of view θ, that is, a differential value $dy(\theta)/d\theta$ of the projection characteristic $y(\theta)$ at the half angle of view θ. The differential value $dy(\theta)/d\theta$ corresponds to local resolution at the imaging height y. The larger the differential value $dy(\theta)/d\theta$ is, the higher the local resolution is. High local resolution means high local imaging magnification.

The imaging optical system 11 has a resolution in the central angle-of-view area (referred to as central resolution hereinafter) higher than that of the orthographic projection method ($y(\theta)=f\times\sin\theta$) which has a high resolution among the projection methods of general fisheye lenses.

Distortion caused by the optical characteristic of the imaging optical system 11 is suppressed in the low angle-of-view area (center angle-of-view area), and distortion near the center of the image is thereby reduced. Therefore, an image in a low angle-of-view area can have a natural sense of perspective in the visual inspection. That is, electronic distortion correction processing can be eliminated or a correction amount can be reduced.

The imaging optical system 11 has a wider area (angle of view) in which distortion caused by the optical characteristic of the imaging optical system 11 is suppressed than that of a general fisheye lens, and can maintain an area that does not require the above electronic distortion correction processing wider than that of the general fisheye lens.

As described above, the imaging optical system 11 has a higher center resolution than that of the orthographic projection method, which has a higher center resolution among the general fisheye lens projection methods, and may be configured so that distortion caused by the optical characteristic in a low angle-of-view area is suppressed. However, this embodiment is not limited to this example. For example, the imaging optical system 11 may be configured to have the opposite characteristic.

More specifically, the imaging optical system 11 may be configured to have a projection characteristic such that the resolution of a high angle-of-view area (peripheral angle-of-view area) is higher than the resolution of the central angle-of-view area. In other words, the imaging optical system 11 may be configured to have a projection characteristic such that a rate of increase (tilt) at an image height y is small in the central area near the optical axis, where the angle of view is small, and a rate of increase in the image height y increases as the angle of view increases in the peripheral area. In this case, the projection characteristic may be a projection characteristic in which a change at the image height y is larger than that of a general equidistant projection ($y=f\theta$) or even a stereoscopic projection ($y=2f\tan(\theta/2)$). The thus configured imaging optical system 11 also has a wider area (angle of view) in which distortion caused by the optical characteristic of the imaging optical system 11 is suppressed than that of a general fisheye lens, so an area that does not require the above electronic distortion correction can be set wider than that of a general fisheye lens.

The second acquiring unit **22*b* acquires the change amount in information about the imaging optical system 11 in the peripheral area (frame area) of the target pixel in the image acquired by the image pickup apparatus 10. For example, in a case where the peripheral areas 101 and 102 are set, the second acquiring unit 22*b* acquires the change amount in the peripheral areas 101 and 102. While the second acquiring unit 22*b* acquires the change amount in the information about the imaging optical system 11** in the peripheral area using a differential filter in this embodiment, another method may be used.

Figures 5, 6:
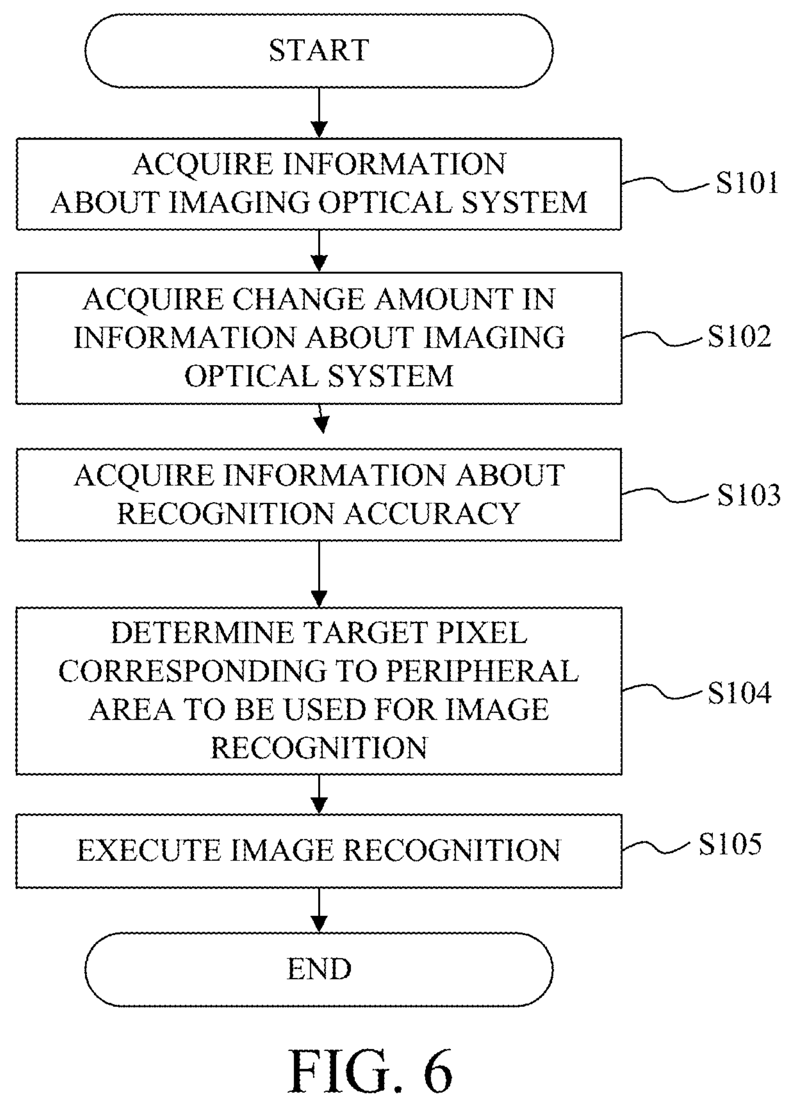
FIG. 5 is a table illustrating a (correspondence) relationship between a change amount in a focal length and recognition accuracy by a recognition apparatus.
FIG. 6 is a flowchart illustrating an image recognizing method of an image recognizing system according to Example 1.

The third acquiring unit **22*c* acquires (calculates) information about the recognition accuracy by the recognition apparatus 21 in the peripheral area based on the change amount acquired by the second acquiring unit 22*b*. In this embodiment, the third acquiring unit 22*c* acquires the information about the recognition accuracy by the recognition apparatus 21 in the peripheral area using the information indicating the (correspondence) relationship between the change amount in the information about the imaging optical system 11 and the recognition accuracy by the recognition apparatus 21. For example, the third acquiring unit 22*c* acquires the information about the recognition accuracy in the peripheral area by the recognition apparatus 21 using the table illustrated in FIG. 5 illustrating the relationship between the change amount in the focal length and the recognition accuracy by the recognition apparatus 21. The information about the recognition accuracy is information representing the recognition accuracy, and may be information representing recognition accuracy in terms of high and low values as illustrated in FIG. 5**, or may be information representing recognition accuracy in numerical values.

Here, as illustrated in FIGS. 2A and 2B, the change amount in the information about the imaging optical system 11 (parameter indicating image magnification) in the peripheral area 101 is small, and the change amount in the information about the imaging optical system 11 in the peripheral area 102 is small. Therefore, the third acquiring unit **22*c* acquires recognition accuracy such that the recognition accuracy of the target pixel corresponding to the peripheral area 101 is higher than the recognition accuracy of the target pixel corresponding to the peripheral area 102**.

In acquiring information about the recognition accuracy by the recognition apparatus 21 in the peripheral area, the third acquiring unit **22*c* uses a table illustrating the relationship between the change amount in focal length and the recognition accuracy by the recognition apparatus 21 in this embodiment, but this embodiment is not limited to this example. For example, the third acquiring unit 22*c* may use an equation that indicates the relationship between the change amount in focal length and the recognition accuracy by the recognition apparatus 21**.

The control unit **22*d* performs processing using the information about the recognition accuracy by the recognition apparatus 21 in the peripheral area acquired by the third acquiring unit 22*c***.

Due to the above configuration, the image processing apparatus 22 can easily estimate whether or not highly accurate image recognition can be performed.

A description will now be given of a method of image recognition by the image recognizing system 1 according to each example.

Example 1

In this example, the control unit **22*d* determines a target pixel to be used for image recognition by the recognition apparatus 21. More specifically, in a case where the information about the recognition accuracy by the recognition apparatus 21 in the peripheral area acquired by the third acquiring unit 22*c* satisfies a predetermined condition, the control unit 22*d* (determines to cause) causes the recognition apparatus 21 to use the target pixel corresponding to the peripheral area. On the other hand, in a case where the information about recognition accuracy in the peripheral area does not satisfy the predetermined condition, the control unit 22*d* determines not to allow the recognition apparatus 21 to use (prohibits the recognition apparatus 21** from using) the target pixel corresponding to the peripheral area.

This example does not perform the predetermined image correction processing (distortion correction) for the target pixel that the control unit **22*d* causes the recognition apparatus 21 to use. That is, in this example, in a case where the information about the recognition accuracy by the recognition apparatus 21 in the peripheral area satisfies the predetermined condition, the control unit 22*d* determines to cause the recognition apparatus 21** to use the target pixel corresponding to the peripheral area without performing predetermined image correction processing (distortion correction).

The control unit **22*d* may determine the peripheral area to be used for image recognition by the recognition apparatus 21. More specifically, in a case where the information about the recognition accuracy by the recognition apparatus 21 in the peripheral area acquired by the third acquiring unit 22*c* satisfies the predetermined condition, the control unit 22*d* may determine to cause the recognition apparatus 21 to use the peripheral area. In this case, in a case where the information about the recognition accuracy in the peripheral area does not satisfy the predetermined condition, the control unit 22*d* prohibits the recognition apparatus 21 from using (causes the recognition apparatus 21** not to use) the peripheral area.

FIG. 6 is a flowchart illustrating the image recognition method of the image recognizing system 1 according to this example.

In step S101, the first acquiring unit 22*a* acquires information about the imaging optical system 11.

In step S102, the second acquiring unit 22*b* acquires a change amount in the information about the imaging optical system 11 in a peripheral area of a target pixel in an image acquired by the image pickup apparatus 10. This example sets the peripheral area to have a predetermined size. For example, the peripheral area may be set to have the same size at all angles of view of the image pickup apparatus 10, that is, the number of pixels included in the peripheral area may be set to a fixed value. The peripheral area may be set depending on the angle of view of the image pickup apparatus 10, for example, depending on an expected value of the size of the object at each angle of view.

In step S103, the third acquiring unit 22*c* acquires information about recognition accuracy by the recognition apparatus 21 in the peripheral area based on the change amount acquired by the second acquiring unit 22*b* in step S102.

In step S104, the image processing apparatus 22 determines a target pixel corresponding to the peripheral area to be used for image recognition by the recognition apparatus 21. More specifically, the image processing apparatus 22 first determines whether the information about the recognition accuracy by the recognition apparatus 21 in the peripheral area acquired by the third acquiring unit 22*c* in step S103 satisfies a predetermined condition. For example, in a case where the information about the recognition accuracy by the recognition apparatus 21 in the peripheral area is numerically expressed so as to increase in proportion to the height of the recognition accuracy, the image processing apparatus 22 determines whether the information about the recognition accuracy by the recognition apparatus 21 in the peripheral area is equal to or higher than a predetermined value. Next, in a case where the image processing apparatus 22 determines that the information about the recognition accuracy by the recognition apparatus 21 in the peripheral area satisfies the predetermined condition, the image processing apparatus 22 determines to cause the recognition apparatus 21 to use the target pixel corresponding to the peripheral area. On the other hand, in a case where the image processing apparatus 22 determines that the information about the recognition accuracy by the recognition apparatus 21 in the peripheral area does not satisfy the predetermined condition, the image processing apparatus 22 determines not to allow the recognition apparatus 21 to use (prohibits the recognition apparatus 21 from using) the target pixel corresponding to the peripheral area.

The control unit 22*d* may cut out, from the image acquired by the image pickup apparatus 10, an area (second area) that includes an area (first area) consisting of the target pixel to be used by the recognition apparatus 21. The second area may be as large as or larger than the first area. Making the second area larger than the first area can restrain the recognition apparatus 21 from being unable to perform accurate image recognition at the boundary of the cutout. In a case where the first area is a peripheral portion of the image acquired by the image pickup apparatus 10, the image processing apparatus 22 may divide and cut the second area.

The control unit 22*d* may also fill an area (fourth area) that includes at least a part of the area (third area) consisting of the target pixel not to be used by the recognition apparatus 21 in the image acquired by the image pickup apparatus 10. The fourth area may be as large as or smaller than the third area. Making the fourth area smaller than the third area can restrain the recognition apparatus 21 from being unable to perform accurate image recognition at the boundary of the cutout.

In step S105, the recognition apparatus 21 performs image recognition for the target pixel that the control unit 22*d* causes the recognition apparatus 21 to use in step S104, and recognizes the type of object illustrated in the image.

The configuration according to this example can suppress the number of pixels for which the recognition apparatus 21 performs image recognition, and can shorten the processing time.

Example 2

In this example, the control unit 22*d* associates (correlates) information about the result of image recognition performed by the recognition apparatus 21 using the image acquired by the image pickup apparatus 10 and the recognition accuracy by the recognition apparatus 21 in the peripheral area acquired by the third acquiring unit 22*c* with each other.

Figures 7, 8:
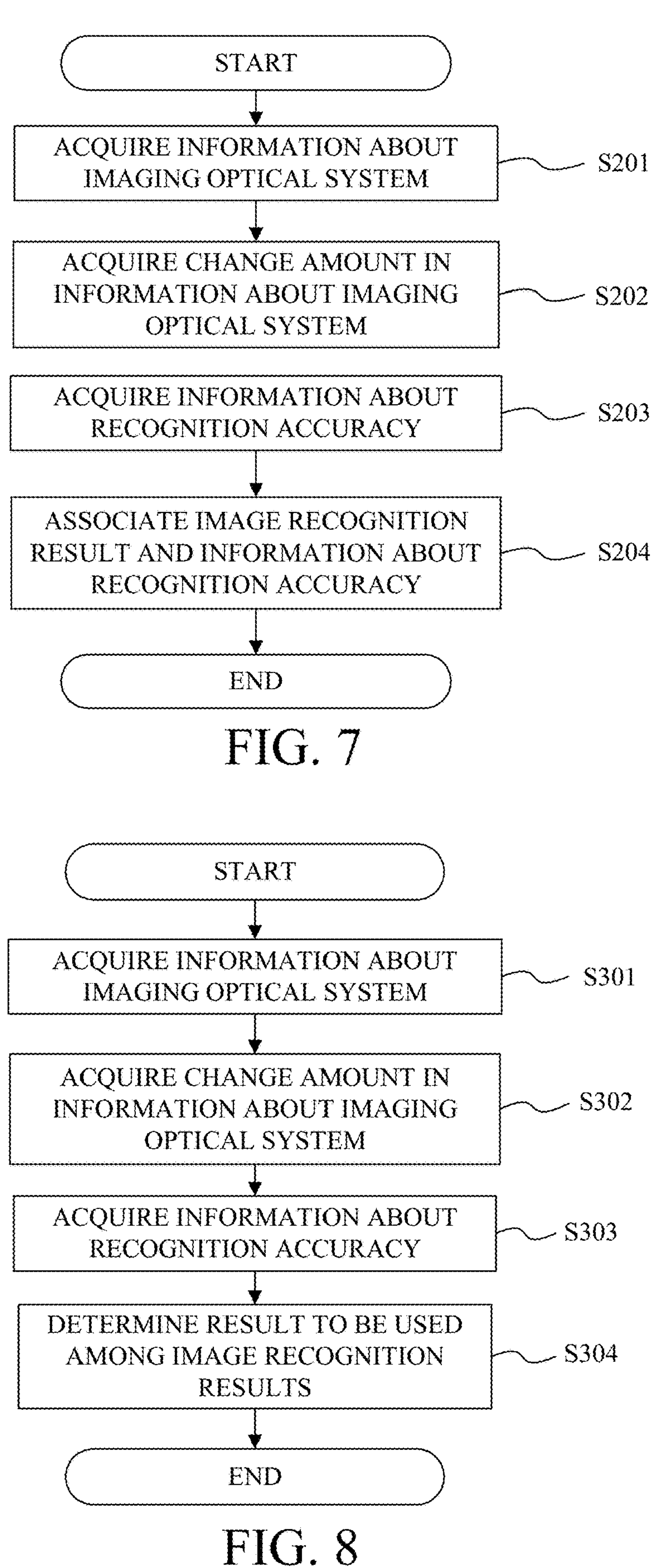
FIG. 7 is a flowchart illustrating processing of an image recognizing system according to Example 2.
FIG. 8 is a flowchart illustrating processing of an image recognizing system according to Example 3.

FIG. 7 is a flowchart illustrating the image recognition method of the image recognizing system 1 according to this example. Assume that while the flow of FIG. 7 is being executed (before the processing of step S204 is executed), the recognition apparatus 21 performs image recognition using the image acquired by the image pickup apparatus 10, and recognizes the type of object illustrated in the image.

In step S201, the first acquiring unit 22*a* acquires information about the imaging optical system 11.

In step S202, the second acquiring unit 22*b* acquires the change amount in the information about the imaging optical system 11 in the peripheral area of the target pixel in the image acquired by the image pickup apparatus 10. In this example, the peripheral area is set to have a predetermined size. For example, the peripheral area may be set to have the same size at all angles of view of the image pickup apparatus 10, that is, the number of pixels included in the peripheral area may be set to a fixed value. The peripheral area may be set depending on the angle of view of the image pickup apparatus 10, for example, depending on the expected value of the size of the object at each angle of view. In this example, the second acquiring unit 22*b* acquires the change amount in the information about the imaging optical system 11 for the entire area of the image.

In step S203, the third acquiring unit 22*c* acquires information about recognition accuracy by the recognition apparatus 21 in the peripheral area based on the change amount acquired by the second acquiring unit 22*b* in step S202.

In step S204, the control unit 22*d* associates (correlates) the result of the image recognition performed by the recognition apparatus 21 using the image acquired by the image pickup apparatus 10 and the information about the recognition accuracy by the recognition apparatus 21 in the peripheral area acquired by the third acquiring unit 22*c* in step S203 with each other. Thereafter, in this embodiment, the control unit 22*d* determines the information to be used from among the result of the image recognition by the recognition apparatus 21. More specifically, the control unit 22*d* first determines whether the information about the recognition accuracy by the recognition apparatus 21 in the peripheral area satisfies the predetermined condition. For example, in a case where the information about the recognition accuracy by the recognition apparatus 21 in the peripheral area is numerically expressed so as to increase in proportion to the level of the recognition accuracy, the control unit 22*d* may determine whether the information about the recognition accuracy by the recognition apparatus 21 in the peripheral area is equal to or higher than a predetermined value. Next, in a case where the control unit 22*d* determines that the information about the recognition accuracy by the recognition apparatus 21 in the peripheral area satisfies the predetermined condition, the control unit 22*d* determines to use the result of image recognition performed by the recognition apparatus 21 using the peripheral area. On the other hand, in a case where the control unit 22*d* determines that the information about recognition accuracy by the recognition apparatus 21 in the peripheral area does not satisfy the predetermined condition, the control unit 22*d* determines not to use the result of image recognition performed by the recognition apparatus 21 using the peripheral area.

The control unit 22*d* may include information about the recognition accuracy by the recognition apparatus 21 in the peripheral area in the result of image recognition performed by the recognition apparatus 21 using the image acquired by the image pickup apparatus 10.

The control unit 22*d* may store not only current information that associates the image recognition result by the recognition apparatus 21 with the information about the recognition accuracy by the recognition apparatus 21 in the peripheral area, but also information that associates them in the past. That is, the control unit 22*d* may store information that associates the result of the image recognition by the recognition apparatus 21 acquired at a first timing with the information about the recognition accuracy by the recognition apparatus 21 in the peripheral area, and information that associates the result of the image recognition by the recognition apparatus 21 acquired at a second timing later than the first timing with the information on the recognition accuracy by the recognition apparatus 21 in the peripheral area. The control unit 22*d* determines to use the result of the image recognition performed by the recognition apparatus 21 using the peripheral area in which the information about the recognition accuracy by the recognition apparatus 21 does not satisfy the predetermined condition, using information associated at different timings. For example, after it is determined that the information about the recognition accuracy by the recognition apparatus 21 in the peripheral area satisfies a predetermined condition, the result of image recognition with the peripheral area determined not to satisfy the predetermined condition may be used. Even if it is determined a plurality of times that the information about the recognition accuracy by the recognition apparatus 21 in the peripheral area does not satisfy the predetermined condition, if the results of image recognition performed using that peripheral area are all the same, these results may be used.

The configuration according to this example associates the result of image recognition performed using the image acquired by the image pickup apparatus 10 with the information about the recognition accuracy by the recognition apparatus 21 in the peripheral area, thereby providing image recognition having accuracy higher than that of Example 1.

Example 3

This example will describe a setting of the peripheral area based on the result of image recognition performed by the recognition apparatus 21 using an image acquired by the image pickup apparatus 10. In this example, the control unit 22*d* determines the information to be used from among the image recognition results by the recognition apparatus 21.

FIG. 8 is a flowchart illustrating an image recognition method of an image recognizing system 1 according to this example. Assume that while the flow of FIG. 8 is being executed (before the processing of step S302 is executed), the recognition apparatus 21 performs image recognition using the image acquired by the image pickup apparatus 10, and recognizes the type of object illustrated in the image.

In step S301, the first acquiring unit 22*a* acquires information about the imaging optical system 11.

In step S302, the second acquiring unit 22*b* acquires a change amount in the information about the imaging optical system 11 in a peripheral area of a target pixel in an image acquired by the image pickup apparatus 10. In this example, the peripheral area is set based on the result of image recognition performed using the image acquired by the image pickup apparatus 10.

In step S303, the third acquiring unit 22*c* acquires information about recognition accuracy by the recognition apparatus 21 in the peripheral area based on the change amount acquired by the second acquiring unit 22*b* in step S102.

In step S304, the control unit 22*d* determines the information to be used from among the image recognition results by the recognition apparatus 21. More specifically, the control unit 22*d* first determines whether the information about the recognition accuracy by the recognition apparatus 21 in the peripheral area acquired by the third acquiring unit 22*c* in step S203 satisfies a predetermined condition. For example, in a case where the information about the recognition accuracy by the recognition apparatus 21 in the peripheral area is numerically expressed so as to increase in proportion to the level of the recognition accuracy, the control unit 22*d* may determine whether the information about the recognition accuracy by the recognition apparatus 21 in the peripheral area is equal to or higher than a predetermined value. Next, in a case where the control unit 22*d* determines that the information about the recognition accuracy by the recognition apparatus 21 in the peripheral area satisfies the predetermined condition, the control unit 22*d* determines to use the result of image recognition performed using the peripheral area. On the other hand, in a case where the control unit 22*d* determines that the information about the recognition accuracy by the recognition apparatus 21 in the peripheral area does not satisfy the predetermined condition, the control unit 22*d* determines not to use the result of image recognition performed using the peripheral area.

The configuration according to this example can recognize objects in a range wider than that of Example 1.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each example can provide an image processing apparatus, a control apparatus, an image processing method, and a storage medium, each of which can easily estimate whether or not highly accurate image recognition can be performed.

This application claims the benefit of Japanese Patent Application No. 2022-190385, filed on Nov. 29, 2022, which is hereby incorporated by reference herein in its entirety.

What is claimed is:

1. An image processing apparatus comprising:

a memory storing instructions; and a processor configured to execute the instructions to:

(1) acquire information about an optical system included in an image pickup apparatus configured to capture an image, (2) acquire a change amount in the information about the optical system in a peripheral area of a target pixel in the image based on the information about the optical system, (3) acquire, based on the change amount, information about recognition accuracy in the peripheral area by a recognition apparatus configured to perform image recognition, (4) cause the recognition apparatus to use the target pixel in a case where the information about the recognition accuracy satisfies a predetermined condition, and (5) prohibit the recognition apparatus from using the target pixel in a case where the information about the recognition accuracy does not satisfy the predetermined condition.

2. The image processing apparatus according to claim 1, wherein the processor is configured to acquire the information about the recognition accuracy using information about a relationship between the change amount and the recognition accuracy.

3. The image processing apparatus according to claim 1, wherein in the case where the information about the recognition accuracy satisfies the predetermined condition, the processor is configured to cause the recognition apparatus to use the target pixel without performing predetermined image correction processing.

4. The image processing apparatus according to claim 1, wherein the processor is configured to cut, from the image, an area including the target pixel to be used by the recognition apparatus.

5. The image processing apparatus according to claim 1, wherein the processor is configured to fill an area of the image that includes at least a part of the target pixel not to be used by the recognition apparatus.

6. The image processing apparatus according to claim 1, wherein the processor is configured to associate a result of image recognition performed using the image by the recognition apparatus with the information about the recognition accuracy.

7. The image processing apparatus according to claim 6, wherein the processor is configured to:

determine to use the result of the image recognition performed by the recognition apparatus using the peripheral area in a case where the information about the recognition accuracy satisfies a predetermined condition, and determine not to use the result of the image recognition performed using the peripheral area by the recognition apparatus in a case where the information about the recognition accuracy does not satisfy the predetermined condition.

8. The image processing apparatus according to claim 6, wherein the processor is configured to include the information about the recognition accuracy in the result of the image recognition performed using the image by the recognition apparatus.

9. The image processing apparatus according to claim 6, wherein the memory stores information that associates the result of the image recognition acquired at a first timing with the information about the recognition accuracy, and information that associates the result of the image recognition acquired at a second timing later than the first timing with the information on the recognition accuracy.

10. The image processing apparatus according to claim 1, wherein the number of pixels included in the peripheral area is fixed.

11. The image processing apparatus according to claim 1, wherein the number of pixels included in the peripheral area changes according to an angle of view of the image pickup apparatus.

12. The image processing apparatus according to claim 1, wherein the peripheral area is set based on a result of image recognition performed by the recognition apparatus using the image.

13. A control apparatus comprising:

the image processing apparatus according to claim 1; and the recognition apparatus configured to perform image recognition.

14. An image processing method comprising the steps of:

acquiring information about an optical system included in an image pickup apparatus configured to capture an image;

acquiring a change amount in the information about the optical system in a peripheral area of a target pixel in the image based on the information about the optical system; and acquiring, based on the change amount, information about recognition accuracy in the peripheral area by a recognition apparatus configured to perform image recognition;

causing the recognition apparatus to use the target pixel in a case where the information about the recognition accuracy satisfies a predetermined condition; and prohibiting the recognition apparatus from using the target pixel in a case where the information about the recognition accuracy does not satisfy the predetermined condition.

15. A non-transitory computer-readable medium storing a program that causes a computer to execute the image processing method according to claim 14.

* * * * *